United States Patent
Bui et al.

(10) Patent No.: US 11,381,987 B1
(45) Date of Patent: Jul. 5, 2022

(54) MOBILE COMMUNICATIONS BASE STATION SITE SURVEY

(71) Applicant: Bastille Networks, Inc., Atlanta, GA (US)

(72) Inventors: Nicola Bui, Mountain View, CA (US); Rahul Nagraj, San Francisco, CA (US); Christian Sepulveda, San Mateo, CA (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

(21) Appl. No.: 17/200,861

(22) Filed: Mar. 14, 2021

(51) Int. Cl.
*H04W 24/08* (2009.01)
*H04W 72/04* (2009.01)

(52) U.S. Cl.
CPC ....... *H04W 24/08* (2013.01); *H04W 72/0453* (2013.01)

(58) Field of Classification Search
CPC ..... H04W 24/00; H04W 24/02; H04W 24/08; H04W 72/04; H04W 72/044; H04W 72/0453; H04W 72/08; H04W 72/085
See application file for complete search history.

(56) References Cited

U.S. PATENT DOCUMENTS

| 2015/0350914 | A1* | 12/2015 | Baxley | H04W 72/0453 726/11 |
| 2016/0127404 | A1* | 5/2016 | Baxley | H04W 4/70 726/22 |
| 2016/0127907 | A1* | 5/2016 | Baxley | G01S 5/0263 726/22 |
| 2016/0127931 | A1* | 5/2016 | Baxley | H04W 4/021 455/67.16 |

* cited by examiner

*Primary Examiner* — Siu M Lee
(74) *Attorney, Agent, or Firm* — Eversheds Sutherland (US) LLP

(57) ABSTRACT

Systems and methods can support surveying mobile wireless base stations. One or more radio frequency antennas can be positioned within an electromagnetic environment where user equipment devices are serviced by base stations. One or more radio frequency receivers can electrically couple signals from the radio frequency antennas. The signals can be scanned by the radio frequency receivers for synchronization with one or more of the base stations. Downlink channels from the identified base stations may be decoded. Performance metrics may be collected regarding the decoded downlink channels. Optimization parameters may be established to improve effective monitoring of the base stations under constraints associated with the radio frequency antennas and the radio frequency receivers. Optimization results associated with the performance metrics and the optimization parameters may be computed and leveraged to allocate the radio frequency antennas and the radio frequency receivers to monitor traffic associated with the base stations.

20 Claims, 4 Drawing Sheets

MOBILE COMMUNICATIONS BASE STATION SITE SURVEY

BACKGROUND

Mobile, high-speed wireless communication systems, such as those employing the Long-Term Evolution (LTE), 4G, or 5G standards, transfer sizable payloads of data among a large number of cell towers, base stations, and mobile device. The potentially huge number of radio frequency systems and their intentionally overlapping coverage areas and frequencies make it difficult to monitor and analyze the associated wireless channels. For example, it remains challenging to determine how many base stations are operating within a given area, which user devices are communicating with which of those base stations, and which base station a user device may begin communicating with upon entering the environment.

There is a need in the art for efficiently and effectively monitoring and evaluating radio communications associated with mobile, high-speed wireless communication systems, such as those employing LTE, 4G, or 5G standards. Fulfilling this need involves radio frequency signal collection and signal processing systems operable to identify base stations serving a site, such as a building or campus. Such technologies also involve determining which base stations new user devices will connect with upon entering the site. Monitoring and evaluating communication between the base stations and user equipment devices should be optimized across available monitoring resources.

SUMMARY

In certain example embodiments described herein, methods and systems can support surveying mobile wireless base stations. One or more radio frequency antennas can be positioned within an electromagnetic environment where user equipment devices are serviced by base stations. One or more radio frequency receivers can electrically couple signals from the radio frequency antennas. The signals can be scanned by the radio frequency receivers for synchronization with one or more of the base stations. Downlink channels from the identified base stations may be decoded. Performance metrics may be collected regarding the decoded downlink channels. Optimization parameters may be established to improve effective monitoring of the base stations under constraints associated with the radio frequency antennas and the radio frequency receivers. Optimization results associated with the performance metrics and the optimization parameters may be computed and employed to allocate the radio frequency antennas and the radio frequency receivers to monitor traffic associated with the base stations.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
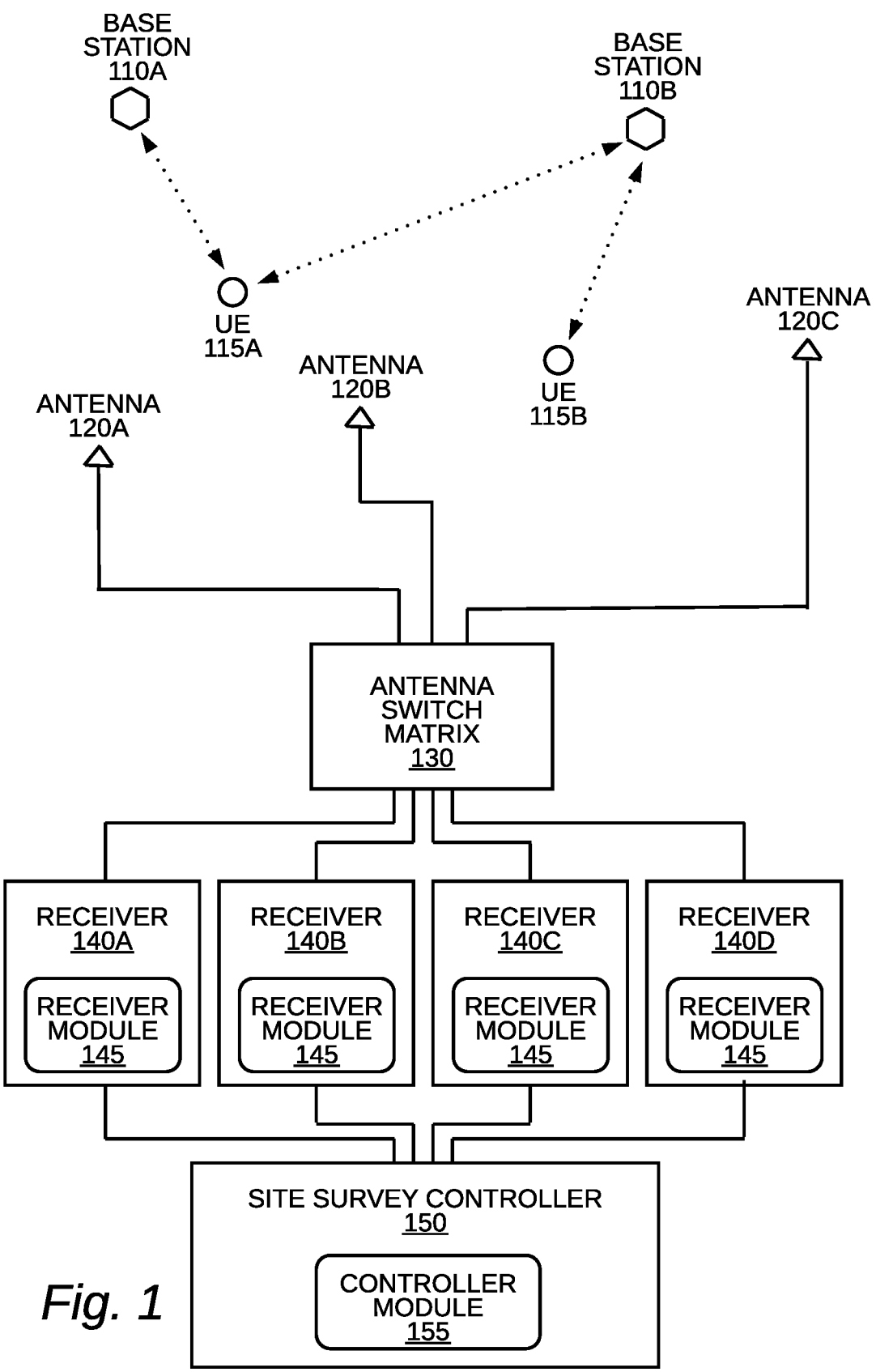
FIG. 1 is a block diagram depicting a site survey system operating within an electromagnetic environment in accordance with one or more embodiments presented herein.

The methods and systems described herein enable site surveys for mobile communications between base stations and mobile user equipment devices. It may be desirable to monitor, measure, or otherwise evaluate mobile wireless communications within a given operating environment such as a building, campus, or other area. The operating environment may be referred to as the site to be surveyed. Such evaluation needs may be related to security, resource allocation, infrastructure planning, or other site management objectives.

Radio frequency hardware and associated control and optimization modules may be deployed to identify one or more base stations and optimize the efficiency and efficacy of base station monitoring. Such optimization can determine improved configurations for multi-antenna, multi-receiver systems used to monitor cellular communications. Observations of base stations operating in, or near, a site can be evaluated through optimization to predict which of those base stations will be used by mobile devices entering the site for given carriers, frequency bands, locations, and so forth.

A particular user equipment device, such as a mobile phone or cellular modem, can search for a base station available for connection. Unfortunately, a mobile phone generally only identifies one tower and only among those associated with its own carrier. Cellular modems may initially detect a large set of nearby towers including the neighbors of the nearest towers due to coverage overlap. Monitoring traffic associated with such an unnecessarily large set of base stations is generally not practical and is also not likely to be useful with respect the specific site under evaluation. The technology presented herein optimizes site surveys reducing the needs of monitoring and evaluating all the networks in the area by selecting those that are more easily received instead of the more commonplace production use case of one particular end user device.

Radio frequency antennas and receivers can collect radio signals associated with mobile, high-speed wireless communication systems, such as those employing LTE, 4G, or 5G standards. Systems associated with the antennas and receivers can detect the base stations within, or near, a site while configuring connections between the antennas and receivers to optimize monitoring of traffic serviced by each base station. The systems can leverage metrics, such as key performance indicators (KPIs), to determine which base stations to monitor for which mobile traffic and using which resources. These optimized determinations and resource allocations for site monitoring can be automated and adaptive to correct for changes within the operating environment over time.

It should be appreciated that while the present disclosure illustrates functionality using examples and terminology associated with long term evolution (LTE) or other specific mobile communication systems, the spirit and scope of the technology disclosed herein extend broadly to a wide variety of wireless communication systems.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

FIG. 1 is a block diagram depicting a site survey system operating within an electromagnetic environment in accordance with one or more embodiments presented herein. Site survey antennas 120 can detect radio frequency signals used to communicate between base stations 110 and user equipment devices 115. The signals detected by the site survey antennas 120 may be coupled into site survey receivers 140. The coupling may leverage an antenna switch matrix 130. The antenna switch matrix 130 can be configured and reconfigured to couple signals from particular site survey antennas 120 into particular site survey receivers 140. Operation of each site survey receiver 140 may leverage one or more receiver modules 145. The site survey receivers 140 may be configured or controlled by a site survey controller 150. The site survey controller 150 may also aggregate and evaluate output from the site survey receivers 140. Operation of the site survey controller 150 may leverage one or more controller modules 155.

The base stations 110A-110B may be referred to, in general or collectively, as base stations 110 or as a base station 110. The base stations 110 may comprise, or be associated with, cellular communication towers, cell sites, pico cells, or other wireless access infrastructure of one or more mobile RAN (radio access network) systems. The base stations 110 may comprise radio transmitters and receivers that communicate over wireless channels with user equipment devices 115 and relay signals to wireless carriers. The base stations 110 may also transmit signals from one cell site to the next or into communication core or relay networks.

The user equipment devices 115A-115B may be referred to, in general or collectively, as user equipment devices 115 or as a user equipment device 115. The user equipment devices 115 may include mobile handsets, smartphones, tablets, computers, wearable devices, hot spots, internet of things devices, M2M systems, embedded computing devices, building system devices, industrial control/automation systems, physical security systems, security monitoring devices, automotive systems, avionics, point of sales systems, customer localization systems, inventory systems, wireless infrastructure, access control systems, and so forth. The user equipment devices 115 may use GSM, CDMA, satellite, LTE technology, 3G, 4G, 5G, or various other wireless communication technologies.

User equipment devices 115 can communication wirelessly with base stations 110. Radio signals transmitted from the user equipment devices 115 and received at the base stations 110 may be referred to as radio uplink signals. Radio signals transmitted from the base stations 110 and received at the user equipment devices 115 may be referred to as radio downlink signals.

The site survey antennas 120A-120C may be referred to, in general or collectively, as site survey antennas 120 or a site survey antenna 120. The site survey antennas 120 may be radio frequency (RF) antenna devices tuned for cellular communications. The site survey antennas 120 can collect electromagnetic signals over a wide bandwidth of radio frequencies for the purpose of surveying, monitoring, or evaluating the operating environment of one or more radio access networks. The site survey antennas 120 may be directional antennas. The site survey antennas 120 may be positioned or configured to support optimal reception from a given direction, or band, or network. The site survey antennas 120 may be tunable to different cellular frequencies or frequency bands.

The site survey receivers 140A-140D may be referred to, in general or collectively, as site survey receivers 140 or a site survey receiver 140. The site survey receivers 140 may comprise hardware-defined radio receivers or software-defined radio receivers. The site survey receivers 140 can receive radio signals over a wide bandwidth of radio frequencies for the purpose of surveying, monitoring, or evaluating the operating environment of one or more radio access networks.

The site survey receivers 140 can openly monitor downlink radio channels transmitted from a base station 110 to a user equipment device 115. The site survey receivers 140 can acquire synchronization signals, such as the LTE primary synchronization signal (PSS). The site survey receivers 140 can decode radio channel information blocks such as the LTE master information block (NEB) or various LTE system information blocks (SIBs). The site survey receivers 140 can convert received radio frequency energy into digital signals. The site survey receivers 140 can decode cellular plain-text communication, such as information blocks that are not encrypted or cipher encoded. Operation of each site survey receiver 140 may leverage one or more receiver modules 145.

The antenna switch matrix 130 may be a configurable device operable to interconnect site survey antennas 120 to site survey receivers 140. The antenna switch matrix 130 may be reconfigured while in operation. The antenna switch matrix 130 can interconnect site survey antennas 120 and site survey receivers 140 such that a signal received at a site survey antenna 120 can be coupled into one or more site survey receivers 140. According to certain example configurations, coupling the signal from one site survey antenna 120 into multiple site survey receivers 140 may be useful for monitoring multiple frequencies, or frequency bands, from one site survey antenna 120.

In certain embodiments, each site survey receiver 140 may only be fed an input signal from one site survey antenna 120 at a given time. Changing the source site survey antenna 120 being monitored by a particular site survey receiver 140 can be done by reconfiguring the antenna switch matrix 130. The site survey antennas 120 may be coupled to the site survey receivers 140 directly, via the antenna switch matrix 130, or through some other mechanism.

The site survey controller 150 can configure and control the site survey receivers 140 and the antenna switch matrix 130. The site survey controller 150 may also aggregate and evaluate output from the site survey receivers 140. Operation of the site survey controller 150 may leverage one or more controller modules 155.

Figure 4:
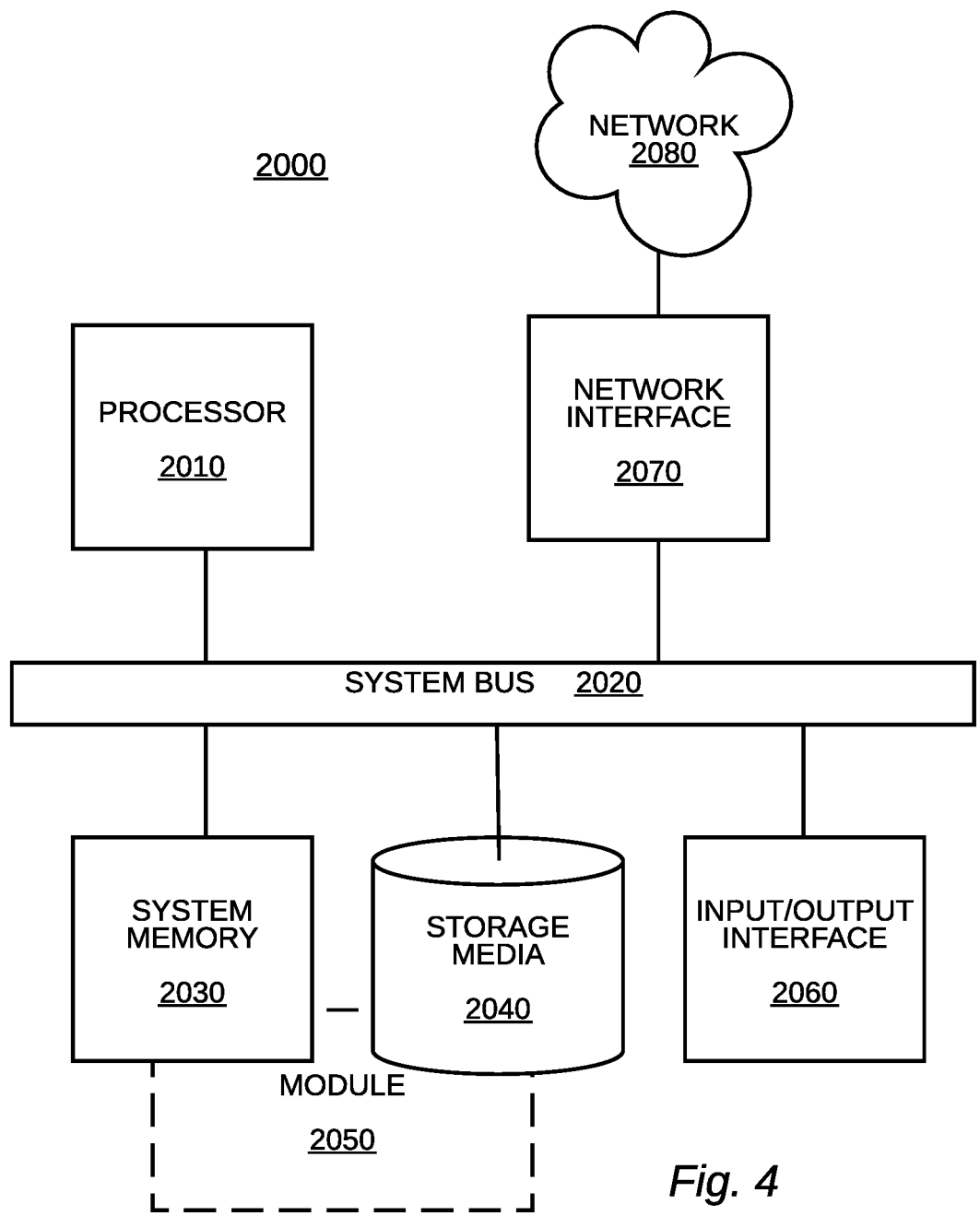
FIG. 4 is a block diagram depicting a computing machine and a module in accordance with one or more embodiments presented herein.

The site survey controller 150, the site survey receivers 140, the site survey antennas 120, the antenna switch matrix 130, or any other systems associated with the technology presented herein may comprise any type of computing machine such as, but not limited to, those discussed in more detail with respect to FIG. 4. Furthermore, any modules associated with any of these computing machines, such as the receiver modules 145, the controller module 155, or any other modules (scripts, web content, software, firmware, or hardware) associated with the technology presented herein may be any of the modules discussed in more detail with respect to FIG. 4. The devices and computing machines discussed herein may communicate with one another as well as other computing machines or communication systems over one or more networks. The networks may include any type of data or communications links or network technology including any of the network technology discussed with respect to FIG. 4.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 2:
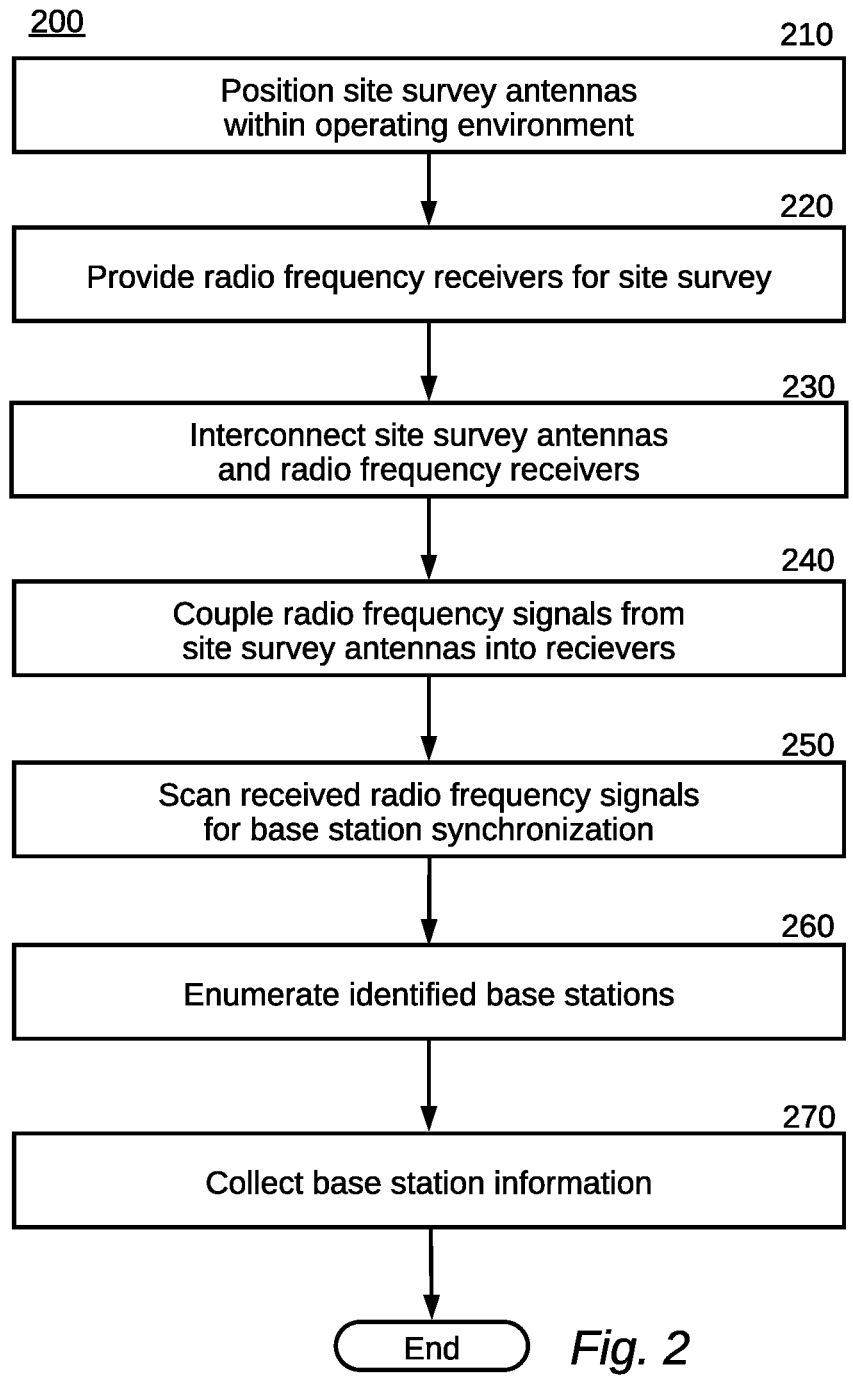
FIG. 2 is a block flow diagram depicting a method of identifying base stations for site survey in accordance with one or more embodiments presented herein.

FIG. 2 is a block flow diagram depicting a method 200 of identifying base stations for site survey in accordance with one or more embodiments presented herein. In block 210, the site survey antennas 120 can be positioned within or around an operating environment such as a building, campus, or other geographical area or volume. The operating environment may be referred to as the site to be surveyed. The site survey antennas 120 can collect electromagnetic signals over a wide bandwidth of radio frequencies for the purpose of surveying, monitoring, or evaluating the operating environment of one or more radio access networks. The site survey antennas 120 may be positioned or configured to support optimal reception from a given direction, or band, or network. The site survey antennas 120 may be tunable to different cellular frequencies or frequency bands.

In block 220, site survey receivers 140 can be provided in association with the site to be surveyed. The site survey receivers 140 can openly monitor downlink radio channels transmitted from a base station 110 to a user equipment device 115. The site survey receivers 140 can acquire synchronization signals, such as the LTE primary synchronization signal (PSS), and decode radio channel information blocks such as the LTE master information block (MIB) or various LTE system information blocks (SIBs). The site survey receivers 140 can decode cellular plain-text communication, such as information blocks that are not encrypted or cipher encoded.

In block 230, the site survey antennas 120 can be interconnected with the site survey receivers 140. The site survey antennas 120 may be interconnected to the site survey receivers 140 through the antenna switch matrix 130, using direct cabling, or other similar mechanism. Direct cabling may include cables, waveguides, media converters, and so forth. Such cabling may also be used in conjunction with the antenna switch matrix 130.

In block 240, radio frequency signals received at the site survey antennas 120 may be coupled into the site survey receivers 140. The antenna switch matrix 130 can split and/or switch radio frequency signals from the site survey antennas 120 to the site survey receivers 140 such that a signal received at a site survey antenna 120 can be coupled into one or more site survey receivers 140. The site survey controller 150 can configure the antenna switch matrix 130. According to certain example configurations, coupling the signal from one site survey antenna 120 into multiple site survey receivers 140 may be useful for monitoring multiple frequencies, or frequency bands, from one one site survey antenna 120. In certain embodiments, each site survey receiver 140 may only be fed an input signal from one site survey antenna 120 at a given time. Changing the source site survey antenna 120 being monitored by a particular site survey receiver 140 can be done by reconfiguring the antenna switch matrix 130 by the site survey controller 150.

In block 250, the received radio frequency signals can be scanned for base station synchronization signals. The radio frequency signals on various frequencies received at the variety of site survey antennas 120 from various directions can represent different views of the variety of base stations 110. Scanning over this combined search space for synchronization signals, such as the LTE primary synchronization signal (PSS), can expose the base stations 110 accessible from each site survey antenna 120.

In block 260, identified base stations 110 maybe enumerated. The site survey controller 150 can assemble a list of base stations 110 for which synchronization signals are identified within the received radio frequency signals. Scanning for synchronization signals within the range of possible frequencies and possible directions from all of the site survey antennas 120 can generate a comprehensive list of base stations 110 operable within the site being surveyed.

In block 270, operating information for the enumerated base stations 110 can be collected. For each of the base stations 110 that have been enumerated, one or more site survey receivers 140 can decode and collect radio channel information. Such information may include, for example, the contents of LTE master information blocks (MIBs) or various LTE system information blocks (SIBs).

According to certain embodiments, the operating information can be decoded using one or more downlink decoders associated with one or more site survey receivers 140. The operating information can be aggregated by the site survey controller 150. The operating information for each base station 110 can include wireless carrier, frequencies, directions, and so forth.

Figure 3:
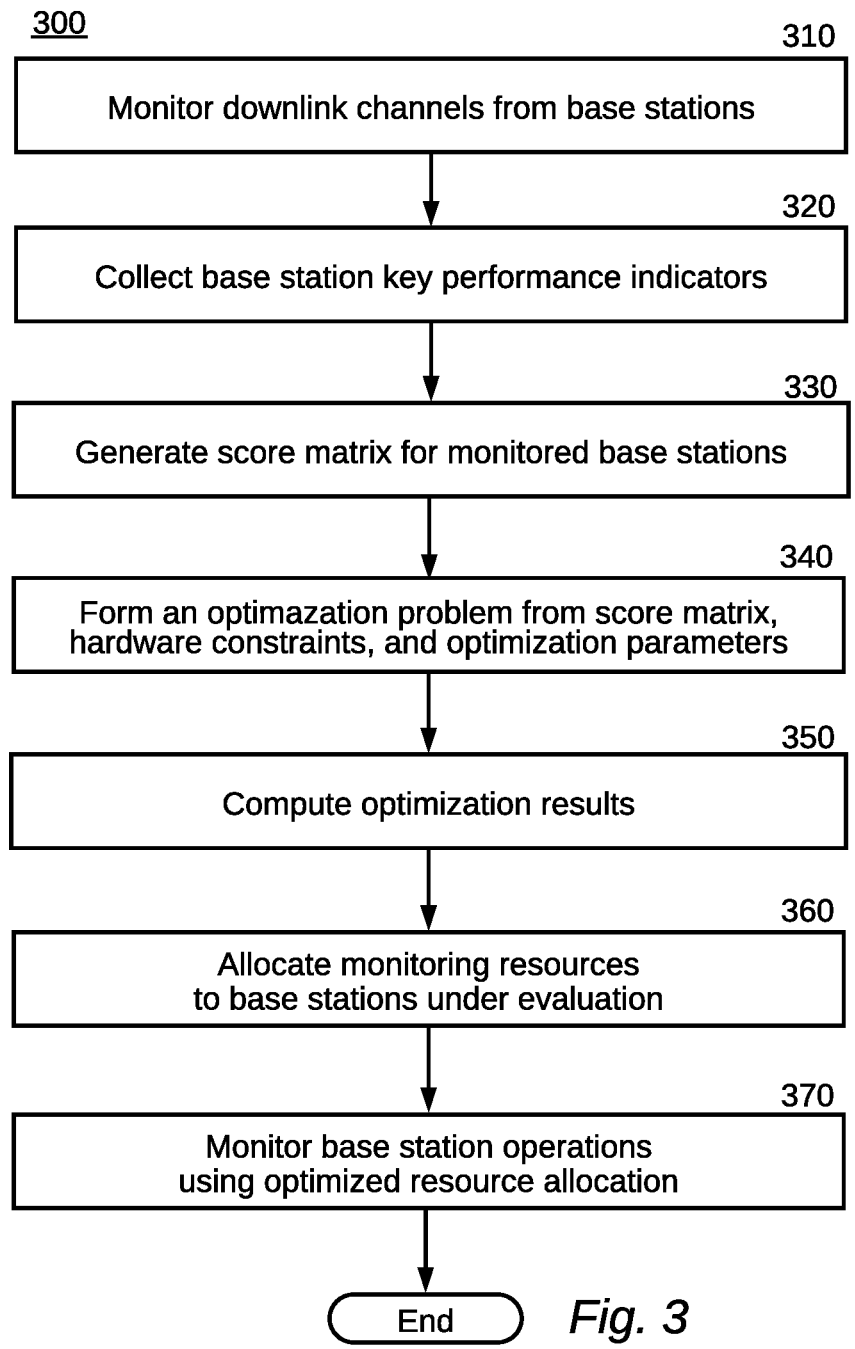
FIG. 3 is a block flow diagram depicting a method for optimizing base station monitoring in accordance with one or more embodiments presented herein.

FIG. 3 is a block flow diagram depicting a method 300 for optimizing base station monitoring in accordance with one or more embodiments presented herein. In block 310, downlink channels from base stations 110 can be monitored by the site survey system. The signals received from each base station 110 can be decoded using one or more downlink decoders associated with one or more site survey receivers 140. The information broadcast by each base station 110 can be decoded over time to assess connection quality for the base station 110.

In block 320, key performance indicators (KPI) can be collected for each base station 110. For a given pair of site survey antenna 120 and base station 110, the measured performance indicators can be collected along with the base station 110 information such as wireless carrier, frequency bands, and so forth. The KPIs may include, but are not limited to, signal to noise ratios, other signal level metrics, other noise ratios, percentage of downlink broadcast messages successfully decoded, carrier frequency offsets, and several others.

In block 330, a score matrix can be generated for the monitored base stations 110. The score matrix S can comprise elements $s_{ij}$ representing the score of tower i received at antenna j. The scores may be normalized such that they take values in the range [0, 1].

In block 340, an optimization problem may be formed from the score matrix S, hardware constraints, and optimization parameters. Optimization parameters maybe be defined to serve one or more optimization goals associated with improving effective monitoring of the base stations under constraints. Where the constraints are associated with the site survey antennas 120, the site survey receivers 140, and other system limitations or operational goals.

The hardware constraints may be associated with the site survey antennas 120, such as their quantity, locations, directional setting, tilt settings, gain, frequency bands, and so forth. The hardware constraints may also be associated with the antenna switch matrix 130, such as switch port count, switching architecture, signal splitting, and, among other parameters, the physical connections between the antenna switch matrix 130, site survey antennas 120 and the site survey receivers 140. The hardware constraints may also be associated with the site survey receivers 140, such as their quantities, operating frequencies, sampling rates, noise parameters, sensitivity parameters, and so forth. The optimization parameters may be related to the carriers operating in the area, frequencies to be monitored, the number of base stations 110, the priority of monitoring particular base stations or carriers, the number of expected user equipment devices 115, the site size, and various other parameters associated with the site monitoring operations.

In block 350, results may be computed for the optimization problem. The optimized results may be used to allocate monitoring resources. For example, to specify which site survey antenna 120 and site survey receiver 140 (according to the necessary antenna switch matrix 130 configuration) will be allocated to monitor a particular base station 110, or antenna sector, or frequency associated with that particular base station 110. As another example, the optimization may identify which base stations 110 to monitor (or prioritize monitoring) as they are more likely to be connected by user equipment devices 115 entering within the site under observation.

Considering an example with no constraints, an optimal solution might map site survey antennas 120 (or other monitoring resources) to base stations 110 by simply rank ordering relevant KPIs. Adding constraints extends treatment of system configurations into an optimization problem. The optimization may be solved using numerical methods and tools such as CP-SAT for constraint programming. The optimization problem can be defined as a convex optimization problem, combinatorial optimization, or similar optimization under multiple constraints. Such optimizations may be solved using techniques such as least squares, linear programming, convex quadratic minimization, conic optimization, geometric programming, semi-definite programming, entropy maximization, and so forth.

In block 360, radio frequency monitoring resources can be allocated to monitor particular base stations 110 under evaluation. Results from the optimization calculations may be leveraged to configure resources within the monitoring system to effectively and efficiently monitor the identified base stations 110. For example, the optimization results may be used to allocate a particular site survey antenna 120 along with a particular site survey receiver 140 (according to the necessary switch matrix 130 configuration) for monitoring a particular base station 110. The optimization results may be used to maximize system performance through improved allocation of all monitoring resources for covering all base stations 110 given the constraints applied to the optimization.

In block 370, traffic associated with each base station 110 can be monitored using the optimized resource allocation. Once monitoring resources have been allocated, base stations 110 may be monitored and evaluated with increased efficiency and effectiveness. Such evaluation operations may be related to security, resource allocation, infrastructure planning, or other site management objectives. The system optimization processes discussed herein may be updated or repeated periodically over time such that the monitoring system is adaptive to changes in the operating environment.

Example Systems

FIG. 4 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology.

It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for surveying mobile wireless base stations, comprising:
   positioning one or more radio frequency antennas within an electromagnetic environment wherein one or more user equipment devices are serviced by one or more base stations;
   providing one or more radio frequency receivers;
   electrically coupling signals from the radio frequency antennas into the radio frequency receivers;
   scanning the signals received by the radio frequency receivers for synchronization with one or more of the base stations to enumerate available base stations;
   decoding downlink channels from the enumerated base stations;
   collecting performance metrics associated with the decoded downlink channels;
   defining optimization parameters to improve effective monitoring of the base stations under constraints associated with the radio frequency antennas and the radio frequency receivers;
   computing optimization results associated with the performance metrics and the optimization parameters; and
   allocating the radio frequency antennas and the radio frequency receivers to monitor traffic associated with the base stations according to the optimization results.

2. The method of claim 1, wherein the downlink channels comprise one of 4G, 5G, and LTE communications.

3. The method of claim 1, wherein electrically coupling the signals comprises connection through an antenna switch matrix.

4. The method of claim 1, wherein allocating the radio frequency antennas and the radio frequency receivers comprises configuring an antenna switch matrix.

5. The method of claim 1, wherein the radio frequency receivers comprise software defined radio receivers.

6. The method of claim 1, wherein synchronization with the one or more of the base stations comprises detection of a primary synchronization signal.

7. The method of claim 1, wherein decoding the downlink channels comprises decoding a master information block.

8. The method of claim 1, wherein the performance metrics comprise radio signal levels.

9. The method of claim 1, wherein the performance metrics comprise signal to noise ratios.

10. The method of claim 1, wherein computing the optimization results comprises solving a convex optimization problem.

11. A system for surveying mobile wireless base stations, comprising:
    one or more radio frequency antennas;
    an antenna switch matrix;
    one or more radio frequency receivers configured to:
    receive radio frequency signals from the one or more radio frequency antennas via the antenna switch matrix,
    scan the signals received by the radio frequency receivers for synchronization with one or more base stations to enumerate available base stations, and
    decode downlink channels from the enumerated base stations; and
    a site survey controller comprising one or more processing units, and one or more processing modules configuring the one or more processing units to:
    collect performance metrics associated with the decoded downlink channels,
    define optimization parameters to improve effective monitoring of the base stations under constraints associated with the radio frequency antennas and the radio frequency receivers,
    compute optimization results associated with the performance metrics and the optimization parameters, and
    allocate the radio frequency antennas and the radio frequency receivers to monitor traffic associated with the base stations according to the optimization results.

12. The system of claim 11, wherein the downlink channels comprise one of 4G, 5G, and LTE communications.

13. The system of claim 11, wherein allocating the radio frequency antennas and the radio frequency receivers comprises configuring the antenna switch matrix.

14. The system of claim 11, wherein the radio frequency receivers comprise software defined radio receivers.

15. The system of claim 11, wherein synchronization with the one or more of the base stations comprises detection of a primary synchronization signal.

16. The system of claim 11, wherein decoding the downlink channels comprises decoding a master information block.

17. The system of claim 11, wherein the performance metrics comprise radio signal levels.

18. The system of claim 11, wherein the performance metrics comprise signal to noise ratios.

19. The system of claim 11, wherein computing the optimization results comprises solving a convex optimization problem.

20. A system for surveying mobile wireless base stations, comprising:
- one or more radio frequency antennas;
- an antenna switch matrix;
- one or more radio frequency receivers configured to receive radio frequency signals from the one or more radio frequency antennas via the antenna switch matrix, scan the radio frequency signals for synchronization with one or more base stations, and decode downlink channels from the one or more base stations; and
- a site survey controller comprising one or more processing units, and one or more processing modules configuring the one or more processing units to collect performance metrics associated with the decoded downlink channels and optimize configuration of the switch matrix to improve monitoring of the base stations under constraints associated with the radio frequency antennas, the radio frequency receivers, and monitoring goals.

* * * * *